(12) United States Patent
Brennan et al.

(10) Patent No.: US 9,542,447 B1
(45) Date of Patent: Jan. 10, 2017

(54) SUPPLEMENTING CANDIDATE ANSWERS

(71) Applicant: International Business Machines Corporation, Armonk, NY (US)

(72) Inventors: Paul E. Brennan, Rush (IE); Scott R. Carrier, Apex, NC (US); Michael L. Stickler, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/086,605

(22) Filed: Mar. 31, 2016

Related U.S. Application Data (63) Continuation of application No. 14/881,900, filed on Oct. 13, 2015.

(51) Int. Cl.
*G06F 7/00* (2006.01)
*G06F 17/30* (2006.01)
*G06F 17/00* (2006.01)

(52) U.S. Cl.
CPC ... *G06F 17/30507* (2013.01); *G06F 17/30654* (2013.01); *G06F 17/30882* (2013.01); *G06F 17/30958* (2013.01)

(58) Field of Classification Search
CPC ............. G06F 17/30507; G06F 17/30654; G06F 17/30882; G06F 17/30958
See application file for complete search history.

(56) References Cited

U.S. PATENT DOCUMENTS

| | | | |
|---|---|---|---|
| 8,346,701 B2 * | 1/2013 | Wang | G06F 17/30634 706/46 |
| 8,538,744 B2 | 9/2013 | Roberts et al. | |
| 8,983,962 B2 | 3/2015 | Nakazawa et al. | |
| 2010/0241647 A1 | 9/2010 | Ntoulas et al. | |
| 2012/0233140 A1 | 9/2012 | Collins-Thompson et al. | |
| 2014/0280307 A1 * | 9/2014 | Gupta | G06N 5/025 707/769 |
| 2015/0347569 A1 | 12/2015 | Allen et al. | |

OTHER PUBLICATIONS

List of IBM Patents or Patent Applications Treated as Related, Jul. 20, 2016. 2 pages.
Brennan et al., "Supplementing Candidate Answers", U.S. Appl. No. 14/881,900, filed Oct. 13, 2015.
(Continued)

*Primary Examiner* — Kannan Shanmugasundaram
(74) *Attorney, Agent, or Firm* — Brian Welle (57) ABSTRACT

Candidate answers are generated by a question-answering system in response to a question from a user. One or more generated candidate answers are compared to previous question-answer sets. The previous question-answer sets are indexed and stored in a database which includes a knowledge graph on the previous questions-answer sets. A previous question-answer set is identified as correlating with a first generated candidate answers. The previous question-answer set is identified using relationships of the database. The first generated candidate answer is restructured using the question as a statement which is embedded with the first generated candidate answer. The restructured generated candidate answer which correlates with the previous question-answer set is supplemented with content from the previous question-answer set.

1 Claim, 3 Drawing Sheets

(56) References Cited

OTHER PUBLICATIONS

Anonymous, "Question Chaining: Method for asking follow-up questions to a previous question in a similar context to refine a set of answers from the same answer bucket in a natural language question answer (NLQA) system", IP.com Prior Art Database Technical Disclosure. IP.com Electronic Publication: Jun. 18, 2014. IP.com No. 000237479. 3 pages.

\* cited by examiner

SUPPLEMENTING CANDIDATE ANSWERS

BACKGROUND

With the increased usage of computing networks, such as the Internet, users can be inundated and overwhelmed with the amount of information available from various structured and unstructured sources. However, information gaps can occur as users piece together found information which is believed to be relevant during searches on various subjects. To assist with such searches, recent research has been directed to generating Question Answering (QA) systems which may take an input question, analyze it, and return results to the input question. QA systems provide mechanisms for searching through large sets of sources of content and analyzing said sources and content with regard to an input question to determine one or more answers to the question.

SUMMARY

Embodiments of the disclosure provide a method, system, and computer program product for supplementing candidate answers. The candidate answers may be generated by a question-answering system in response to a question from a user. One or more generated candidate answers may be compared to previous question-answer sets. The previous question-answer sets may be indexed and stored in a database which includes a knowledge graph on the previous questions-answer sets. A previous question-answer set may be identified as correlating with a first generated candidate answers. The previous question-answer set may be identified using relationships of the database, such as relationship information from the knowledge graph. The first generated candidate answer may be restructured using the question as a statement which is embedded with the first generated candidate answer. The restructured first generated candidate answer which correlates with the previous question-answer set may be supplemented with content from the previous question-answer set.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to various embodiments of a system and method for supplementing candidate answers. In order to process a large corpus of data, a question-answering (QA) system may analyze a question from a user and return a set of candidate answers created from the corpus. The QA system may store associations from question/answer sets in a knowledge graph. The user of a QA system may have submitted numerous questions to the QA system while analyzing one or more related topics. After determining a new set of candidate answers for a new question of the user, the QA system may detect that portions of previous question/answer sets are related to the new candidate answers. The QA system may supplement the candidate answers with the related portions. The new candidate answer may also be restructured/rephrased to include the question as a statement with the new candidate answers included to provide natural language context for the supplemented information. While the present disclosure is not necessarily limited to such applications, various aspects of the disclosure may be appreciated through a discussion of various examples using this context. Examples and example values discussed herein are provided by way of example only and are not to be construed as limiting.

In instances, a user may use a conventional QA system to research a subject or a group of related subjects. A user may be attempting to find links between the subjects, or links between the subjects may otherwise be of interest. The user may submit a set of questions on the related subjects to the conventional QA system. The conventional QA system may return accurate answers to each question which nonetheless do not include information on links between any subject. In instances, until the user enters a question on a specific link, the conventional QA system may not return an answer with said link.

Aspects of the disclosure are directed towards supplementing candidate answers. A user may submit a number of questions to a QA system in a question-answering session. The QA system may determine candidate answers for the question and provide the candidate answers to the user. A QA controller which is related to the QA system may index the provided candidate answers sets and the corresponding questions, which together may be referred to as question-answer sets, into a database. The database may include a knowledge graph of the concepts between previous questions-and-answer sets (e.g., question-answer sets). The QA controller may detect a new question and, in response, determine a new set of candidate answers for the new question. The QA controller may identify concepts of the new set of candidate answers. The QA controller may mine the knowledge graph to identify elements of previous candidate answer sets which contain similar concepts. The QA controller may then supplement the candidate answers with these elements. The supplemented candidate answers may then be provided to the user. In this way a QA controller may identify and provide linking concepts and data to a user.

Figure 1:
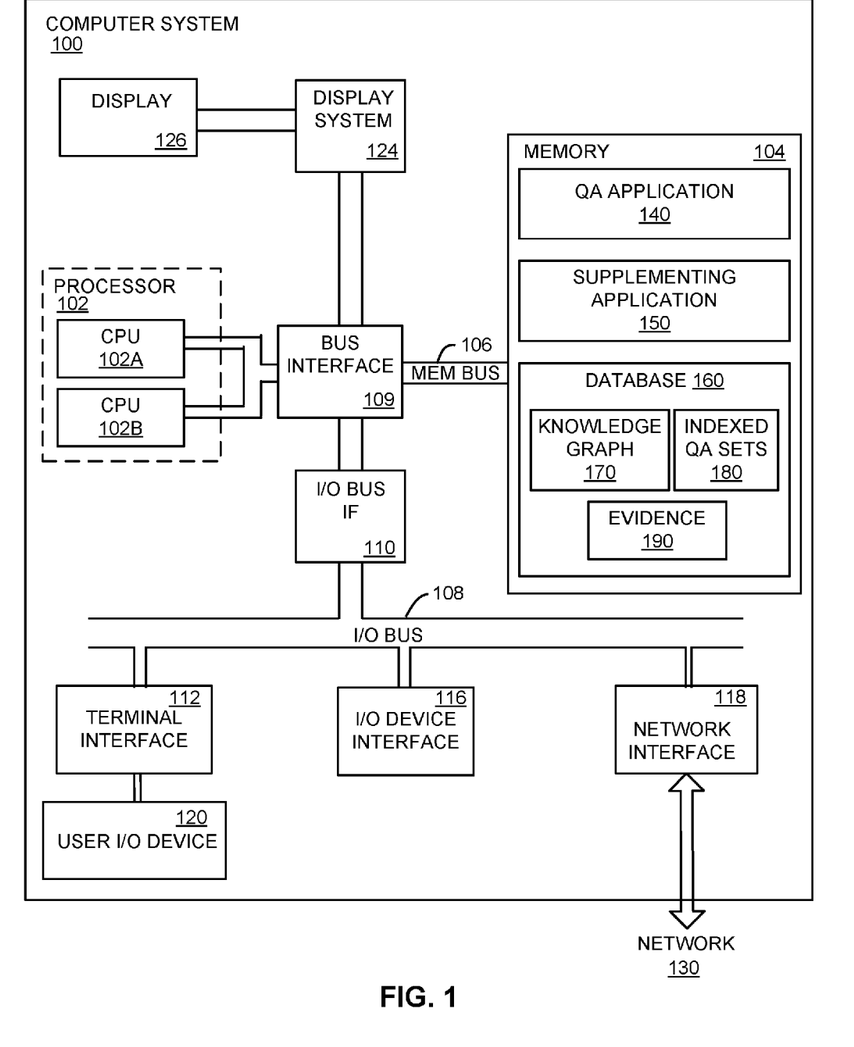
FIG. 1 is an apparatus for supplementing candidate answers, according to embodiments.

FIG. 1 depicts a high-level block diagram of a computer system 100 for supplementing candidate answers. The components of the various embodiments disclosed herein apply equally to any appropriate computing system. The components of the example computer system 100 shown in FIG. 1 may include a memory 104, a terminal interface 112, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may include one or more general-purpose programmable central processing units (CPUs) 102A and 102B, herein generically referred to as the processor or processors 102. In some embodiments, the computer system 100 may contain multiple processors; however, in certain embodiments, the computer system 100 may alternatively be a single CPU system. Each processor 102 executes instructions—such as the instructions from the QA application 140 or the supplementing application 150 to perform the acts described with respect to method 200— stored in the memory 104.

In some embodiments, the memory 104 may include a random-access semiconductor memory, storage device, or storage medium (either volatile or non-volatile) for storing or encoding data and programs. The memory 104 can include stored data such as a database 160 which contains data on previous question-answer sets. The database may include a question-answer index 180 which indexes previous user questions to determined/provided QA candidate answers. The database 160 may also include a knowledge graph 170 which organizes and categorizes associations between elements of these previous questions and answers. In certain embodiments, the database 160 may contain evidence 190 which is associated with question-answer sets of the indexed QA sets 180 and/or data points of the knowledge graph 170. This evidence 190 may provide ancillary information which was identified by the supplementing application 150 and/or QA application 140 while supplementing/generating previous candidate answer sets, but was not included in said previous candidate answer sets. In certain embodiments, the memory 104 represents the entire virtual memory of the computer system 100, and may also include the virtual memory of other computer systems coupled to the computer system 100 or connected via a network. In such embodiments, the database 160 which includes a knowledge graph 170 and question-answer index 180 may be stored in other computer systems of the network 130, and the supplementing application 150 may access the database 160/knowledge graph 170/QA index 180 through the network interface 118.

The memory 104 may store all or a portion of the various programs, modules and data structures for processing data transfers as discussed herein. For instance, the memory 104 can include the supplementing application 150. In this illustrative embodiment, the supplementing application 150 includes instructions or statements that execute on the processor 102 or instructions or statements that are interpreted by instructions or statements that execute on the processor 102 to carry out functions (e.g., the acts of method 200) as further described below. In some embodiments, the supplementing application 150 may act in response to the QA application 140 determining a set of candidate answers. In certain embodiments, the supplementing application 150 may be a part of the QA application 140. However, in other embodiments, the supplementing application 150 is implemented in hardware via semiconductor devices, chips, logical gates, circuits, circuit cards, and/or other physical hardware devices (e.g., ASIC or FPGA) in lieu of, or in addition to, a processor-based system.

In this example, the computer system 100 includes a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. The display may be used to provide candidate answers from the QA application 140, or candidate answers determined by the QA application 140 and supplemented by the supplemental application 150. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using an input device in order to provide input data and commands to programs such as the supplementing application 150. For example, a computer system 100 which includes an I/O device 120 may allow a user to submit questions to the QA system 140 or configure the knowledge graph 170 or other data of the database 160 using such input devices 120 such as, but not limited to, a mouse and a graphical display. In other embodiments, QA questions or association data may be submitted by the user over the network 130.

The I/O device interface 116 provides an interface to any of various other I/O devices or devices of other types, such as printers or fax machines. The network interface 118 provides one or more communication paths from the computer system 100 to other digital devices and computer systems.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

FIG. 1 depicts several example components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
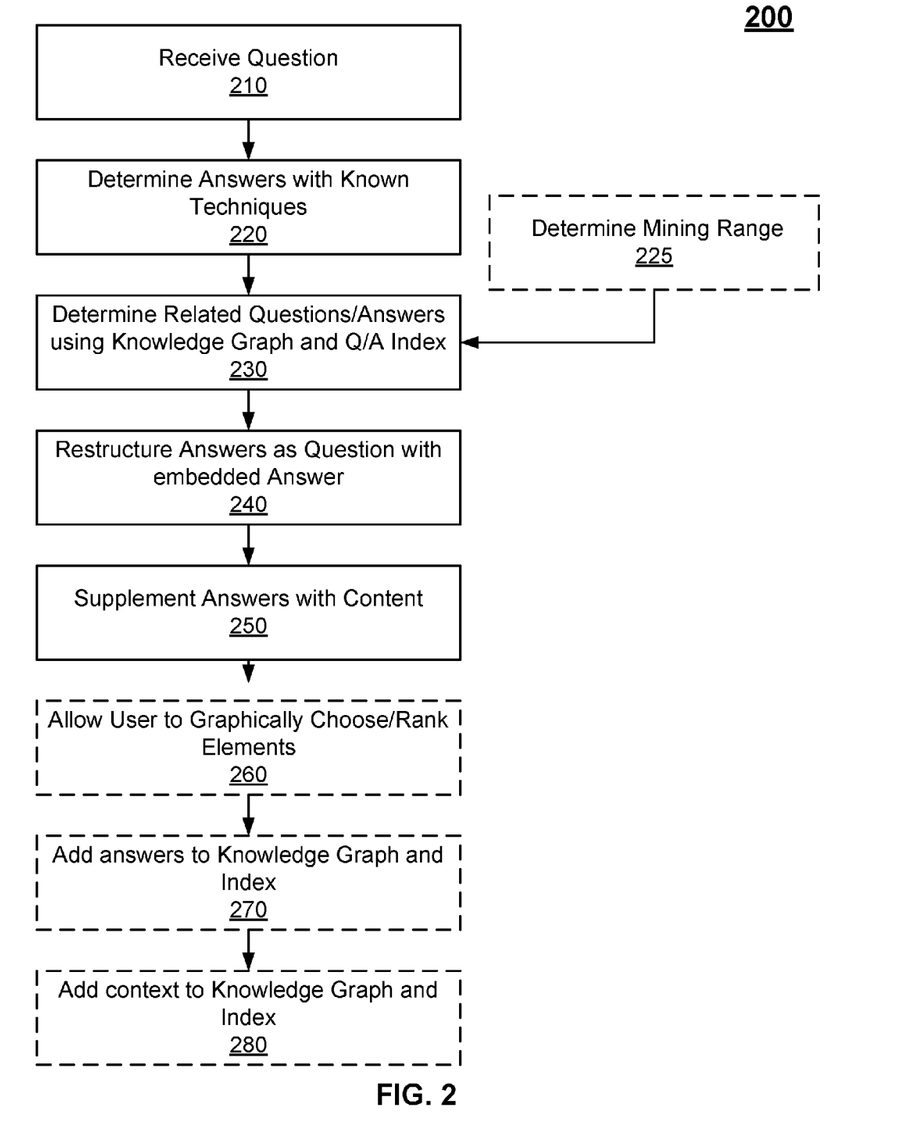
FIG. 2 is a method of supplementing candidate answers, according to embodiments.

FIG. 2 is a flowchart illustrating a method 200 for supplementing candidate answers. A QA system may determine the candidate answers for a user. In some embodiments, the QA system may also supplement the candidate answers. In other embodiments, a QA controller which is associated with the QA system may supplement the candidate answers. The QA system and QA controller may reside on one or more computers, such as the computing device 100 as discussed above. Blocks with hashed lines in FIG. 2 are optional steps within method 200. The visual arrangement of blocks in the flowchart of FIG. 2 is not to be construed as limiting the order in which the individual acts/operations may be performed, as certain embodiments may perform the operations of FIG. 2 in alternative orders.

At block 210 the QA system receives a question from a user. The user may have submitted the question as part of a greater question-answering session. In some embodiments, a question-answering session may include a plurality of questions with unifying traits submitted to a QA system wherein the traits increase the likelihood that some of the questions include related concepts. Method 200 may include using questions submitted within a question-answering session to determine related data to supplement candidate answers. By using question-answer sets within a session to determine supplemental data, the QA controller may reduce false positives on suggested relevant data.

For an example of a question-answering session, suppose a user submits ten questions in five minutes. In this example, the question-answering session may be identified using a unifying trait of being close-in-time. A QA controller may determine that submitted questions have increased likelihood of being related when being asked in relatively quick succession. In other examples, being close-in-time may be measured in hours, days, or other temporal units. If a temporal proximity is set to minutes or hours, the QA controller may determine that questions submitted at the end of one day may functionally be asked within minutes of questions asked at the beginning of the next day, even when separated by hours of sleep or "free time." For example, if an employee at a company asks ten questions between 4:30 PM and 5:00 PM and then asks an additional ten questions between 8:00 AM and 8:30 AM the next day, the QA controller may determine that all twenty questions were functionally asked within an hour of each other, as the non-active time (e.g., 5:00 PM first day-8:00 AM second day) was not during business hours.

In other embodiments, the QA system may determine that questions are within a question-answering session by detecting input from the user identifying the question as such. For example, when a user begins working on a certain project, they may select a session identifier associated with that project. To further the example, a QA system may store an indexed set of questions and answers and associated knowledge graphs on a plurality of subjects where each subject corresponds to a project of a user. Projects may include, for example, a supply chain in Indiana, a market proposal in California, and a patent query in the Northeast U.S., etc. As the user engages the QA system, the user may identify a project, whether explicitly (e.g., by selecting an application option or changing a rate clock) or implicitly (e.g., by working on documents associated with the project), which the QA controller may use to identify an ongoing session and associated question-answer index and knowledge graph. In this way, questions a user submits regarding specified projects may be collected and associated together.

In other embodiments, the user may identify a question as part of a certain session through a user identifying a team (e.g., a team of coworkers) for which the questions are asked. For example, the user may be on team A regarding a supply chain in Indiana, team B regarding a market proposal in California, and team C regarding a patent query in the Northeast U.S. By identifying a question for the QA system as being associated with team B, the QA controller may use a question-answer index and knowledge graph of team B to determine supplemental information, which may include questions asked by other members of team B.

At block 220 the QA system may determine candidate answers. The candidate answers may respond to the question from the user in block 210. The QA system may determine candidate answers using QA techniques known to one skilled in the art.

At block 225 the QA controller may optionally determine a mining range for supplemental data. The mining range may be the range of previous question-answer sets which will be mined (e.g., searched for relevant content using a question-answer index and a knowledge graph) for supplemental data. Put differently, the mining range may dictate which previous questions will be used to determine additional content for the current question. The mining range may capture everything within the session. For example, if the QA controller has determined that twenty identified question-answer sets were within the same session as the current question, and the identified question-answer sets were recorded/indexed/graphed, the mining range may coincide with the session, such that all twenty questions are mined. In some embodiments, the QA controller may not maintain ongoing records of numerous overlapping sessions. In such embodiments, the QA controller may determine the mining range to include question-answer sets asked within a certain time frame (e.g., all questions asked within the previous two hours on a regular 24-hour clock or the previous 4 business hours on a business 8-to-5 clock). Alternatively, in such embodiments, the QA controller may determine the mining range to include a certain number of the most recent question-answer sets (e.g., the mining range includes the thirty most recent questions which were asked).

The mining range may be identified at numerous points during the method 200. Where the mining range comprises all question-answer sets from the current session, said mining range may be determined after the session is identified, regardless of whether the current session is identified before block 210, between block 210 and block 220, after block 220, or at another time. Alternatively, the mining range may be determined at the initialization of the QA controller by setting a variable (e.g., setting a flag within memory associated with the QA controller application, such as the memory which stores the supplementing application 150 from FIG. 1). Alternatively, the mining range may be selected before each question or for a set of questions in response to user input. Other means of setting/determining a mining range are also possible At block 230, question-answers sets which are related to the current candidate answers are determined. The related question-answer sets may be sets of questions and answers which were previously determined by the QA system for the same user or within the same session. The related question-answer sets may be determined using a question-answer index and knowledge graph.

The QA controller may determine the related question-answer sets by mining a database of question-answer sets for related concepts/associations. The QA controller may use the knowledge graph to determine previous questions which are related. A knowledge graph may include one or more data points with one or more associations with other data points for each indexed question-answer sets. More than one previous question-answer set can be associated with a single data point. The database which includes the knowledge graph may include an index which matches up question-answer sets and data points/associations in the knowledge graph.

Figure 3A:
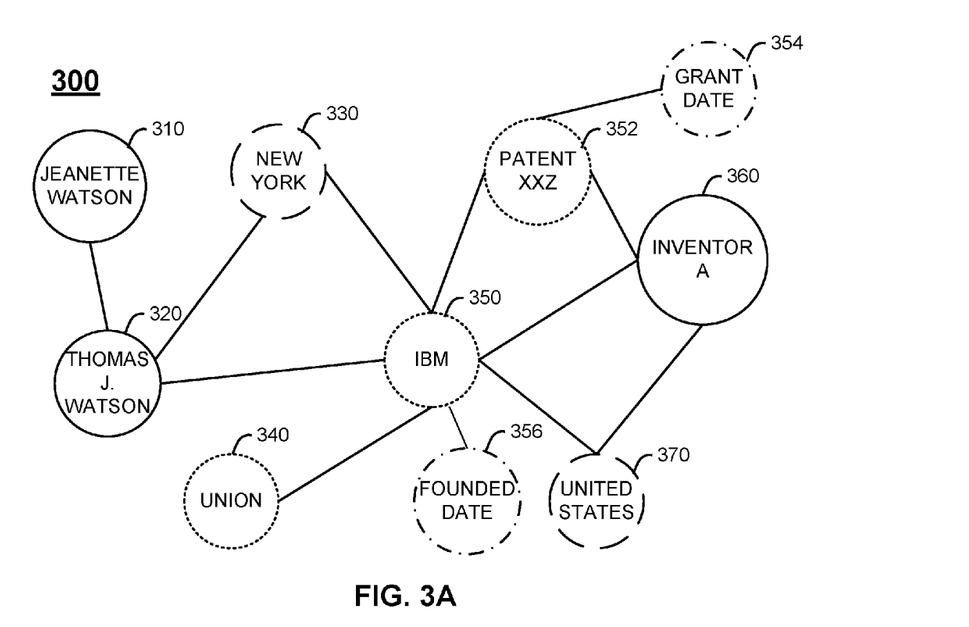
FIG. 3A is a depiction of a knowledge graph, according to embodiments.

An example of a knowledge graph is depicted in FIG. 3A. The knowledge graph 300 in FIG. 3A shows many data points (e.g., circles) with connections/associations (e.g., lines) between them. Each of these data points may represent a conceptual entity (hereinafter referred to as an entity) of a previous question-answer set. For example, IBM 350 has an association with such entities as Thomas J. Watson 320, New York 330, union 340, patent XXZ 355, founded date 356, inventor A 360, and the United States 370. Each of these lines may represent an association, such as an employer/employee association between IBM 350 and inventor A 360 or an incorporation association between New York 330 and IBM 350. Entities may have three-way associations, such as an inventor A 360 which has an inventing association with patent XXZ 355 and a citizen association with United States 370 even as IBM 350 maintains separate associations with patent XXZ 355 and United States 370 in the example shown in FIG. 3A.

Entities may have numerous associations each other (e.g., numerous associations on the same connection/line). For example, the entity Thomas J Watson 320 may have the association of founder, former employee of, and former manager with the entity IBM 350. Some entities may only have associations with a single other entity, such as Jeanette Watson 310 with a marriage association to Thomas J. Watson 320, founded date 356 with a founding date association with IBM 350, and grant date 354 with a granted association with patent XXZ 352 in the example shown in FIG. 3A.

These connections may be used by the QA controller to determine related prior question-answer sets. Where current candidate answers include a set of entities (e.g., nouns), said entities may be thought of as parents, and the QA controller may search for other entities to bring in as children of these parents. The QA controller may determine the children entities as entities which have parent-child relationships (hereinafter referred to as relationships) with the parents of the current question. For example, if a candidate answer includes the parent entity Thomas Watson 320, the QA controller may identify a child entity of Jeanette Watson 310. The QA controller may also use natural language processing (NLP) and the type of association to dig through the knowledge graph to identify specific children entities and certain remote entities (e.g., grandchildren entities to the parent entity). For example, a question "what are the oldest technology companies in the United States" may include a candidate answer with the entity IBM 350. IBM 350, as shown in the example knowledge graph within FIG. 3A, has six child entities. The QA controller may use NLP to identify a potential desired association of history (e.g., associating the word "oldest" with a typical historical associations), and may use this to identify Thomas Watson 320 as a child entity with an association relating to history (e.g., founder of being a historical association) and Jeannette Watson 310 as a grandchild entity relating to history. In this way the QA controller may use NLP on a question and set of candidate answer to analyze a database including a knowledge graph to identify supplemental content.

The QA controller may mine the knowledge graph 300 for entities which have a relationship with entities of the current question and set of candidate answers. These relationships may be Is-a/parent-child relationships. An entity of the knowledge graph 300 may have a relationship with the current question if said entity can be connected through the knowledge graph to a parent entity which matches an entity of the current question or set of candidate answers. In some embodiments, entities of the current question or set of candidate answers may be identified using natural language processing techniques known to one skilled in the art. In some embodiments, entities with sufficient relationships may be identified if said entities/relationships have a confidence score/similarity which satisfies a threshold. A confidence score may be increased based on how far an entity is from the parent entity, how recently a child entity was entered, or how similar the underlying concepts are between the questions of the two entities.

For example, a QA system may receive a first question "Which patents filed within the past year have claims on artificial intelligence," and may determine candidate answers patent XXX, patent XXY, and patent XXZ. Following the question, these data points may be added to a knowledge graph, such as the knowledge graph 300 of FIG. 3A. Specifically, the QA controller may include a new data point patent XXZ 352 connected to new data point grant date 354. The QA controller may connect new entity patent XXZ 352 to existing entity IBM 350 using data of entity patent XXZ 352.

The QA controller may receive a second question regarding which technology companies are incorporated in New York. After the determination by a QA system of a candidate answer "IBM," the QA controller may analyze a knowledge graph. The QA controller may search for entities which have a parent-child relationship with the entity of the answer (IBM) within the knowledge graph 300.

In some embodiments, the QA controller may identify numerous child entities and may select a minority of said child entities for supplemental content. For example, using the knowledge graph 300, the QA controller may determine that six entities are direct children of entity IBM 350. These entities may be evaluated for relevance. The QA controller may determine that entity patent XXZ 352 relates to a concept (e.g., technology) from the second question while the other five entities do not relate to any concepts of the second question (e.g., Thomas J. Watson 320 and Founded Date 356 instead relating to concepts history and origins, Unions 340 and United States 370 instead relating to laws and compliance, etc.). Additionally, the QA controller may determine that entity patent XXZ 352 originated from a question which immediately preceded the second question. Because of both the concept match and the time proximity, patent XXZ 352 and the related grant date 354 may be identified as correlating with the second question.

The QA controller may then restructure the originating question and answer of the entities which correlate with the second question. Restructuring the originating question of entities patent XXZ 352 and grant date 354 may provide context for both the answer and the supplemental data. The QA controller may then use the "ownership" association between IBM 350 and patent XXZ 352 and "granted" association between patent XXZ 352 and grant date 354 to create natural language context. The QA controller may then present the fully contextualized supplemental content of "IBM, the owner of AI patent XXZ which was granted on Nov. 5, 2015, is incorporated in New York."

A database which contains the knowledge graph 300 may also contain evidence on entities within the knowledge graph. For example, the database may contain evidence "machine translation" on entity patent XXZ 352 which provides context as to what patent XXZ 352 regards. This evidence may include links, articles, or other data. The database may include numerous portions of evidence for some entities and no evidence for other entities. The QA controller may supplement the candidate answer with such evidence. For example, the supplemented candidate answer above may be further supplemented as, "IBM, the owner of AI patent XXZ (regarding machine translation) which was granted on Nov. 5, 2015, is incorporated in New York," where machine translation is a hyperlink to information on the subject. In this way, the QA controller may provide supplemental information from previous questions while also providing context and an ability to bring up additional context.

The knowledge graph 300 may also store the entities as certain types of entities to better mine for or prioritize associations/entities. For example, in FIG. 3A, humans (solid circle) are stored as different entities than governments (large dashes), which are stored as different entities than organizations (dots), which are stored as different entities than dates (dash and dots). The QA controller may then respond to user input specifying certain types of entities to prioritize. For example, if the QA controller receives input that human-type entities are important, the QA controller may bring in human-type entities which have a more remote connection (e.g., entities which require more relationships to connect them to entities of the current question). To further the example, suppose the QA controller receives user input prioritizing dates and receives a question about where IBM is incorporated. The QA controller may then broaden a search to find a connection through patent XXZ 352 to grant date 354. Upon identifying a date-type, the QA controller may supplement an original candidate answer "IBM is incorporated in New York" with sufficient content to contextualize the identified grant date 354, eventually presenting a supplemented candidate answer "IBM, which was granted patent XXZ on Nov. 5, 2015, is incorporated in New York." In this way a QA controller may store and utilize various entity types.

At block 240 the QA controller restructures the candidate answers. The candidate answers can be restructured to generate deep natural language context using the relationships and associations of the knowledge graph. A candidate answer can be restructured by turning the current question into a statement which is embedded with the candidate answer. For example, if a question was "What state is IBM incorporated in?" and a candidate answer is "New York," the candidate answer may be restructured to "IBM is incorporated in the state of New York."

The QA controller may restructure all candidate answers, or only those candidate answers for which relevant prior question-answer sets have been identified. For example, if a set of candidate answers includes four candidate answers, and at block 230 supplemental content was identified which related to entities of two of the candidate answers, these two candidate answers may be restructured with the question as a statement with the candidate answer embedded. In such embodiments, the two candidate answers for which the QA controller did not identify supplemental content may remain unchanged (e.g., not restructured).

At block 250 one or more candidate answers are supplemented with additional natural language content. The additional content comes from the previous question-answer sets with similar parent-child relations to entities of the candidate answer set for the current question. The QA controller may supplement the candidate answers by restructuring both the one or more candidate answers and the related previous question-answer sets into grammatically sound natural language statements and adding portions of the previous sets into the current statement. Put differently, the QA system may restructure the previous question-answer sets to create natural language context, such as by replacing the focus of the question with the answer, and then may use this context to supplement the candidate answer sets.

In some embodiments, supplementing the composed candidate answers may include contextualizing supplemental information by using association data of the knowledge graph. Association data may be found in the connection data between a parent entity (e.g., a concept from the candidate answer) of the knowledge graph and a child entity (e.g., supplemental data from a previous question-answer set) of the knowledge graph. Using association data along with the restructured candidate answer may allow the QA controller to provide a deep natural language context for identified supplemental information which may not be as clear without the association data.

For example, the QA controller may use a knowledge graph 300 to determine within the state-of-incorporation example above that parent entities IBM 350 and New York 330 connect with child entity Thomas J. Watson 320. Where the QA controller does not use association data, a candidate answer of "IBM is incorporated in the state of New York [Thomas J. Watson]" may only partially contextualize supplemented data. Instead, the QA controller may determine association data through the connections between parent and child entities. Thomas J. Watson 320 may be connected with New York 330 through "born," "lived," and "died" associations, and may be connected with IBM 350 through "founded" associations. The QA controller may use this association data when supplementing the candidate answer such that the answer reads "IBM is incorporated in the State of New York, which is where Thomas J. Watson—founder of IBM—was born, lived, and died." By supplementing a candidate answer in this way, the QA controller may better organize and contextualize discovered supplemental content within the candidate answers.

For example, using the embodiment above regarding artificial intelligence, the QA controller may restructure the previous question as "IBM has been granted patent XXZ on artificial intelligence." From this, candidate answer XXZ may be presented to the user (e.g., the entity which asked the question) as "XXZ [owned by IBM]." In some embodiments, the current candidate answers may be restructured as grammatically correct sentences with the previous content included. For example, the candidate answer above can be restructured as, "Patent XXZ, owned by IBM, has been granted in the past year." In embodiments where there are numerous candidate answers, individual candidate answers may be restructured separately, or otherwise presented in a grammatically appropriate manner.

The QA controller may add the question and candidate answers to the knowledge graph and index. In some embodiments, the QA controller may also add the supplemented content to the knowledge graph and index. In this way candidate answers may get more robust as the answers "fill in" a complete representation of a situation for a user during a question-answering session. For example, if a further question asks, "Which technology companies are headquartered in the Northeastern United States," the QA controller may format one candidate answer to read, "IBM, owner of patent XXZ regarding artificial intelligence, is headquartered in New York."

In certain embodiments, a user may recall previous questions by toggling back through previous questions and candidate answers. In these embodiments, the QA controller may pull content "back" when toggling through previous question-answer sets. Put differently, supplemental content may be carried bi-directionally such that both the previous question and the current question are stored with the supplemental information based on the rephrased questions. For example, if, after the above example with artificial intelligence, the user toggles back to the question, "which companies have patents on artificial intelligence," the QA controller may return a candidate answer, "IBM, headquartered in New York, has patents on artificial intelligence, including patent XXZ."

Figure 3B:
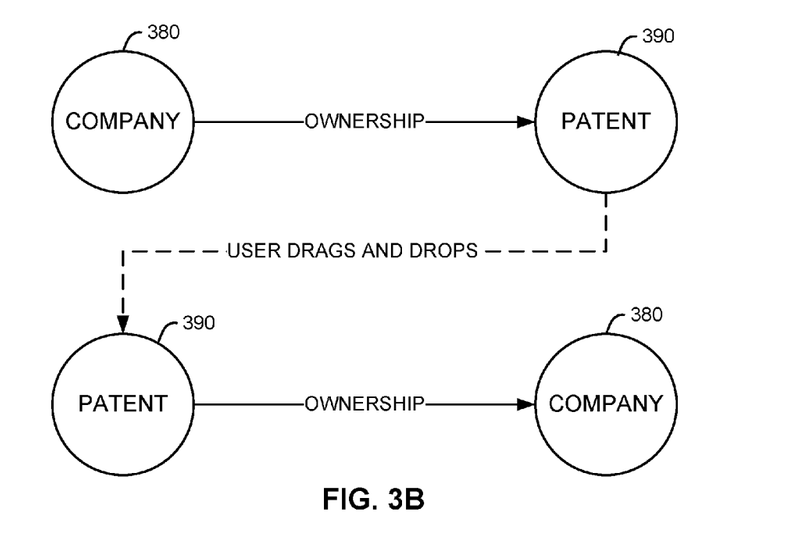
FIG. 3B is a depiction of a user-configured portion of a knowledge, according to embodiments.

In certain embodiments, a user may configure aspects of the knowledge graph. The knowledge graph may be configured to specify certain entities/associations to be used for supplemental content. For example, FIG. 3B depicts a user changing a portion of a knowledge graph. In FIG. 3B, a knowledge graph originally included a first entity of a company 380 with an ownership association with a second entity of a patent 390. As shown in FIG. 3B, a user may drag and drop the patent entity 390 before the company entity 380. Doing so may focus supplemented content on the patent rather than the company. Doing so may also focus the underlying question-answer sets on the patent rather than the company. In certain embodiments, associations between entities may be reciprocal, such that changing the order of entities as in 3B may change the association. For example, the original association between company 380 going to patent 390 on the top of FIG. 3B may by an "OWNED" association, in that the company 380 owns the patent. When the QA controller detects a user dragging the patent 390 before the company 380, the association may change to a "GRANTEDTO" association. The OWNED and GRANTED TO may be symmetric associations. The QA controller may use whichever one of these associations is active, depending upon user input, to structure natural language context within current candidate answers.

In some embodiments, a user may also delete entities within the knowledge graph. Deleting an entity may result in the QA controller no longer using said entity for supplemental content, and may eliminate questions which required the deleted entity. A user may also have the ability to prioritize which type of entity to provide content from, such as only want to learn about people or thing entities rather than organization or government entities.

The functionality outlined in the discussions herein regarding FIG. 1, FIG. 2, FIG. 3A, and FIG. 3B, above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for providing candidate answers in a question-answering system, the method further comprising:
    identifying a first selection of one or more electronic files by a first user, wherein the first user is of a plurality of users that are associated with a plurality of projects, wherein each project of the plurality of projects is associated with both indexed question-answer sets of a database and a knowledge graph of the database;
    determining that the first selection is associated with a project of the plurality of projects, wherein the project is associated with a first set of indexed question-answer sets of the database;
    receiving a first question from a first user at a first point in time;
    adding the first question and a first set of candidate answers that are in response to the first question to the first set of indexed question-answer sets such that the first question and the first set of candidate answers are indexed in the database and mapped into the knowledge graph;
    identifying a second selection of one or more electronic files by a second user, wherein the second user is of the plurality of users;
    determining that the second selection is associated with the project;
    receiving a second question from the second user at a second point in time;
    identifying a second set of candidate answers for the second question;
    identifying a mining range for the second question, wherein the mining range includes a number of business hours preceding the second point in time, wherein business hours only include hours between 8:00 A.M. and 4:00 PM in the time zone of the second user;
    receiving a user request from the second user, wherein the user request indicates a specified type of data of the knowledge graph with which to supplement the second set of candidate answers;
    receiving a second set of candidate answers for the second question;
    determining a subset of the first set of indexed question-answer sets to which the second set of candidate answers will be compared that have been gathered within the mining range and are of the specified type of data;
    comparing the second set of candidate answers to the first question and comparing the second set of candidate answers to the first set of candidate answers using natural language processing and Is-a relationships of the knowledge graph;
    identifying, based on the comparing, the first question and the first set of candidate answer as having a correlation with an identified candidate answer of the second set of candidate answers, wherein the correlation satisfies a confidence score threshold;
    restructuring the identified candidate answer to comprise the second question rephrased as a statement, wherein the identified candidate answer is embedded within the statement; and
    supplementing the restructured identified candidate answer of the second set of candidate answers with content of the first question and first set of candidate answers, wherein the restructured identified candidate answer is supplemented in a grammatically sound manner by using Is-a relationships of the knowledge graph, wherein the content includes a hyperlink to data of the database regarding the second set of candidate answers.

* * * * *